(12) United States Patent
Andrieux et al.

(10) Patent No.: US 10,594,173 B2
(45) Date of Patent: Mar. 17, 2020

(54) ACTUATOR WITH COATED STATOR AND ROTOR MODULES

(71) Applicant: MMT SA, Zug (CH)

(72) Inventors: Gaël Andrieux, Evilard (CH); Pascal Thibaut, Courtelary (CH); Gaëtan Riou, Morteau (FR)

(73) Assignee: MMT SA, Zug (CH)

( * ) Notice: Subject to any disclaimer, the term of this patent is extended or adjusted under 35 U.S.C. 154(b) by 337 days.

(21) Appl. No.: 15/534,885

(22) PCT Filed: Dec. 10, 2015

(86) PCT No.: PCT/EP2015/079302
§ 371 (c)(1),
(2) Date: Jun. 9, 2017

(87) PCT Pub. No.: WO2016/092035
PCT Pub. Date: Jun. 16, 2016

(65) Prior Publication Data
US 2017/0324284 A1 Nov. 9, 2017

(30) Foreign Application Priority Data
Dec. 11, 2014 (FR) ...................... 14 62289

(51) Int. Cl.
*H02K 1/14* (2006.01)
*H02K 11/33* (2016.01)
(Continued)

(52) U.S. Cl.
CPC ............. *H02K 1/146* (2013.01); *H02K 1/148* (2013.01); *H02K 1/278* (2013.01); *H02K 3/325* (2013.01);
(Continued)

(58) Field of Classification Search
CPC ...... H02K 1/146; H02K 11/21; H02K 11/215; H02K 11/33; H02K 1/148; H02K 1/278;
(Continued)

(56) References Cited

U.S. PATENT DOCUMENTS 7,723,878 B2 5/2010 Yagai et al.
9,702,366 B2 7/2017 Aso et al.
(Continued)

FOREIGN PATENT DOCUMENTS

EP 0949747 A1 10/1999
FR 1259035 A 4/1961
(Continued)

*Primary Examiner* — Bernard Rojas
(74) *Attorney, Agent, or Firm* — Harness, Dickey & Pierce, PLC

(57) ABSTRACT

An electronic actuator is made up of a polyphase brushless motor comprising a rotor provided with permanent magnets and secured to an output shaft, and a stator supporting coils and providing the magnetic drive of the rotor, a first electrical connection assembly powering the coils, said stator being built into a stator module made up of a material which coats the wound stator as well as the first electrical connection assembly. The rotor is built into a rotor module made up of a flange coating a bearing that guides the shaft of the rotor. The stator module and the rotor module have elements for indexing and for attachment relative to one another.

20 Claims, 12 Drawing Sheets

(51) Int. Cl.
   *H02K 29/08* (2006.01)
   *H02K 3/52* (2006.01)
   *H02K 5/22* (2006.01)
   *H02K 5/08* (2006.01)
   *H02K 21/24* (2006.01)
   *H02K 3/32* (2006.01)
   *H02K 11/215* (2016.01)
   *H02K 5/173* (2006.01)
   *H02K 21/16* (2006.01)
   *H02K 37/14* (2006.01)
   *H02K 11/21* (2016.01)
   *H02K 1/27* (2006.01)

(52) U.S. Cl.
   CPC ............... *H02K 3/522* (2013.01); *H02K 5/08* (2013.01); *H02K 5/1732* (2013.01); *H02K 5/225* (2013.01); *H02K 11/21* (2016.01); *H02K 11/215* (2016.01); *H02K 11/33* (2016.01); *H02K 21/16* (2013.01); *H02K 21/24* (2013.01); *H02K 29/08* (2013.01); *H02K 37/14* (2013.01); *H02K 2203/09* (2013.01); *H02K 2203/12* (2013.01)

(58) Field of Classification Search
   CPC .... H02K 21/16; H02K 21/24; H02K 2203/09; H02K 2203/12; H02K 29/08; H02K 37/14; H02K 3/325; H02K 3/522; H02K 5/08; H02K 5/1732; H02K 5/225
   See application file for complete search history.

(56) References Cited

U.S. PATENT DOCUMENTS

| | | |
|---|---|---|
| 2006/0013883 A1 | 1/2006 | Nicol et al. |
| 2008/0023028 A1 | 1/2008 | Fujita |
| 2008/0024028 A1 | 1/2008 | Islam et al. |
| 2010/0301691 A1 | 12/2010 | Cors et al. |
| 2011/0057524 A1 | 3/2011 | Andrieux et al. |
| 2014/0294626 A1 | 10/2014 | Aso et al. |

FOREIGN PATENT DOCUMENTS

| | | |
|---|---|---|
| FR | 2899396 A1 | 10/2007 |
| WO | WO-2009/055625 A2 | 4/2009 |
| WO | WO-2011/159674 A1 | 12/2011 |

ACTUATOR WITH COATED STATOR AND ROTOR MODULES

CROSS-REFERENCE TO RELATED APPLICATIONS

This application is a National Phase Entry of International Patent Application Serial Number PCT/EP2015/079302, filed on Dec. 10, 2015, which claims priority to French Patent Application Serial No. 14/62289, filed on Dec. 11, 2014, both of which are incorporated by reference herein.

TECHNICAL FIELD

This invention relates to the field of brushless type polyphase electric motors that have a series of permanent magnets interacting with a soft ferromagnetic stator supporting electric coils. The coils are supplied with a polyphase alternating current through electronic switching provided by an electronic circuit. The invention more specifically proposes an actuator consisting of a motor and an electronic assembly integrated in a compact and simple manner in separate coated modules (for example by overmoulding a plastic, polymer or even metallic material) and then assembled.

In the remainder of this text, the term "motor" is understood to mean all the elements (coil, soft ferromagnetic stator, permanent magnets and possible soft ferromagnetic yoke) of the magnetic circuit making it possible to produce the magnetic force and "actuator" means the entire engine, in its finalized version, associated with the electrical power supply elements of the engine and position sensing elements.

BACKGROUND

There are many permanent magnet brushless polyphase electric motors such as those described in Patent EP0949747 or EP2002531, both by the Applicant. Motors of this type are composed of a wound stator assembly and a rotor assembly comprising a plurality of magnets. In order to ensure the electrical switching of the different phases of these motors, the generally chosen solution consists in using at least one Hall probe placed opposite the plurality of magnets or an auxiliary magnetized assembly dedicated to this switching. In order to embody an actuator, the Hall sensors, as well as the electronic circuit controlling them, and the electrical connector assembly of the motor phases must be assembled in an integral product which can be placed and used in any application (for example for moving different valves, flaps or shafts in an internal combustion engine).

There are various forms of embodiment in prior art solutions. For instance, some solutions consist in partially overmoulding the motor, most often only the stator is overmoulded. Patent Application PCT WO/2009/055625 relates to a stator assembly and to a method for producing a stator assembly. The stator assembly is overmoulded with a thermally conductive and electrically insulating polymer composition. The stator core of the stator assembly is coated with an adhesive component to allow better heat transfer to the interface of the stator core and the overmoulded coils.

Patent application EP1677404 also discloses a motor for an electric power steering, where the connection of the coil can be easily embodied while saving space, and a method of manufacturing the engine. Stator coils are assembled into a stator core and connected per phase by connecting rings. Patent applications EP2781758, US2010/301691, WO2011159674 or US2008/023028 describe other exemplary embodiment of prior art.

Prior art solutions have the disadvantage of a complicated assembly, requiring precise mechanical positioning of the stator parts in the housing and/or with respect to the rotor. During assembly, it is necessary to make multiple mechanical and electrical connections in order to ensure the connection of the coils to a wiring harness or connection elements with the electronic circuit, the electrical connectors and if necessary with a printed circuit. These different operations require high precision and cause fragility of the device.

The overmoulding solutions known in the prior art do make it hard to ensure the coating of all the components of a stator structure and only partially avoid the problem of assembly and electrical connections. Specifically, in the solution proposed in Patent Application EP1677404, the wound stator and the connector technology do not form an encapsulated assembly, which leads to mechanical weaknesses.

SUMMARY

This invention aims at remedying these drawbacks by proposing a device comprising a coated stator module insertable into the housing of a motor or an actuator in order to interact electromagnetically with a rotor and cooperating with a rotor module. The invention, in the widest sense of the term, relates to an electronic actuator made up of a polyphase brushless motor comprising a rotor provided with permanent magnets and secured to an output shaft, and a stator supporting coils and providing the magnetic drive of the rotor, a first electrical connector assembly powering the coils, said stator being built into a stator module made up of a material which coats the wound stator as well as the first electrical connector assembly. The invention is characterized in that the rotor is built into a rotor module made up of a flange coating a bearing that guides the shaft of the rotor, and in that the stator module and the rotor module have elements for indexing and for attachment relative to one another.

The rotor module thus forms a first component integrating:
- the rotor consisting of a cylinder head on which the permanent magnets and the output shaft are mounted,
- a guide element,
- a flange ensuring the coating of this assembly.

The stator module forms a second component integrating:
- the wound stator,
- a first electrical connector assembly,
- these elements being equally coated.

The motor is thus made up of two complementary components that neither require an electrical connection nor fastening hardware. The connection is provided by the complementary configuration of the two coated components, each with an indexed complementary assembly interface to guarantee the precise relative positioning of both these components.

A significant advantage of this coated modular embodiment is better management of the temperature of the electrical connection assemblies and of the printed circuit connecting them. Indeed, when the actuator operates at high temperature, the heat is confined to the level of the stator, which easily supports this thermal load, and is only weakly spread at the back of the actuator towards the electrical and electronic connection elements. It is thus possible to significantly limit the heating of the printed circuit as compared to the prior art.

A major advantage of the invention and its modular embodiment is a significant reduction in the number of parts required for the embodiment of the actuator when compared to the prior art. Optionally, the stator module further comprises an electronic circuit equally coated to form a second Smart Component.

Preferentially but non-exhaustively, the actuator comprises a second electrical connector assembly managing the supply and the signals of the sensing elements necessary for the switching of the various phases of the motor and the stator module coats the first and second electrical connector assembly. This second assembly is thus necessary when one wishes to control the engine thanks to an encoder assembly integrated in the engine. It is not necessary if the motor is to be driven in the sensorless mode.

Preferentially, the stator assembly has a cavity adapted to receive the rotor module. In one form of embodiment, the first and second electrical connection assemblies form a radial coated extension of the stator module. In one form of embodiment, the first and second electrical connection assemblies form an axially coated extension of the stator module.

Preferentially, the flange has an external shape that is complementary to the receiving zone of the stator module in order to allow easy assembly. For instance, the flange of the rotor module has centring pins adapted to engage in complementary housings formed on the stator module.

In one particular embodiment, the stator module comprises a set of superimposed laminations with a plurality of teeth, at least part of which supports an electric coil, each of the electrical coils having axially extending connecting lugs, the stator module further including a plurality of teeth for connecting a complementary connector, all of the components comprising the wound sheet assembly, the coil connecting lugs, and the connector lugs for joining-up a connector are coated with a material insulating plastic to form a monolithic block encompassing the outer surfaces of the superimposed sheets. The inner surface of the teeth of the stator plates can be made flush with the inner surface of the monolithic block and the cavity made cylindrical and closed at its rear part by a moulded bottom. In this case, the moulded bottom may comprise a ring for guiding the rotation axis of the rotor.

According to a variant, the inside surface of the teeth of the stator plates is included in the monolithic block, the thickness of the encapsulating plastic material being less than the air gap between the outer cylindrical surface of the rotor and the cylindrical envelope defined by the surface of the stator teeth. The invention also relates to a magnetized rotor module formed by a coated sleeve comprising a bearing for guiding the rotor, the sleeve being surrounded by a collar capable of being fixed to a stator structure by welding or screwing or riveting. In a variant embodiment, the cavity is open and the actuator has a third module comprising a printed circuit and closing the actuator on the rear part.

The invention also relates to a method for manufacturing a characterized magnetized rotor module in that it comprises the following steps:

overmoulding of the front bearing to form the flange with its positioning and indexing pins, assembly of a stack of laminations on the rotor axis, bonding of the magnet(s) of the motor on the stack of laminations, assembly of the rear bearing on the axle comprising the bundle of laminations.

BRIEF DESCRIPTION OF THE DRAWINGS

The invention will be better understood on reading the following description, with reference to the attached drawings corresponding to non-exhaustive samples of embodiments, where.

DETAILED DESCRIPTION

The invention described relates to a rotary motor formed by assembling a rotor module and a stator module. The components of these modules are mechanically linked so as to be permanently fixed.

The rotor module is permanently assembled. Similarly, the stator module is embedded in an insulating plastic material which only allows the electrical connector elements to protrude. These two modules are assembled by inserting the rotor module into a housing provided for this purpose in the stator module and joined together by screwing, welding or gluing. A third module may optionally close the actuator when the stator module has a cavity opening.

Figure 1:
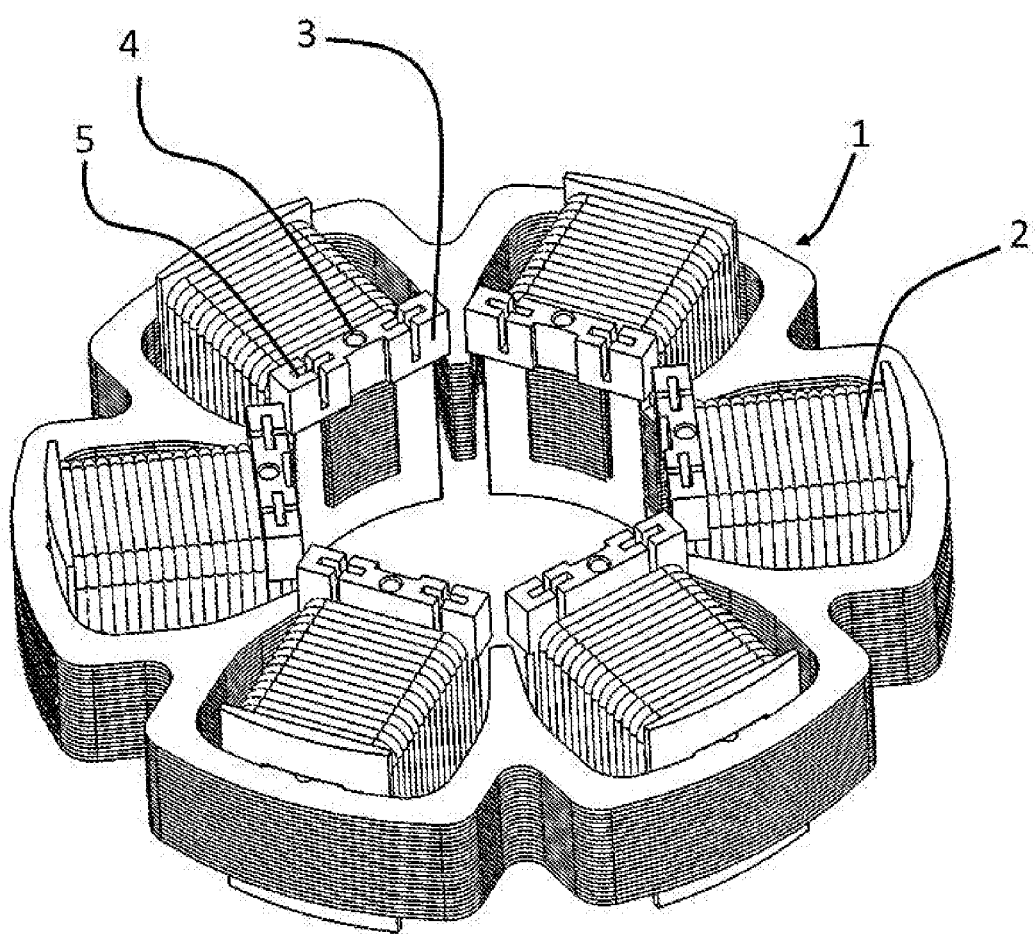
FIGS. 1 and 2 show the stator module wound with by means of electrical connection of the motor and of the sensing assembly.

In a first embodiment, an actuator according to the invention commonly comprises a motor with a stator 1 that has radially extending teeth, equipped with electric coils 2 carried by coil bodies 3 as shown in FIG. 1. In this example described, the motor is three-phase and is described in publication EP2002531, but the invention is in no way limited to this particular technology.

Figure 2:
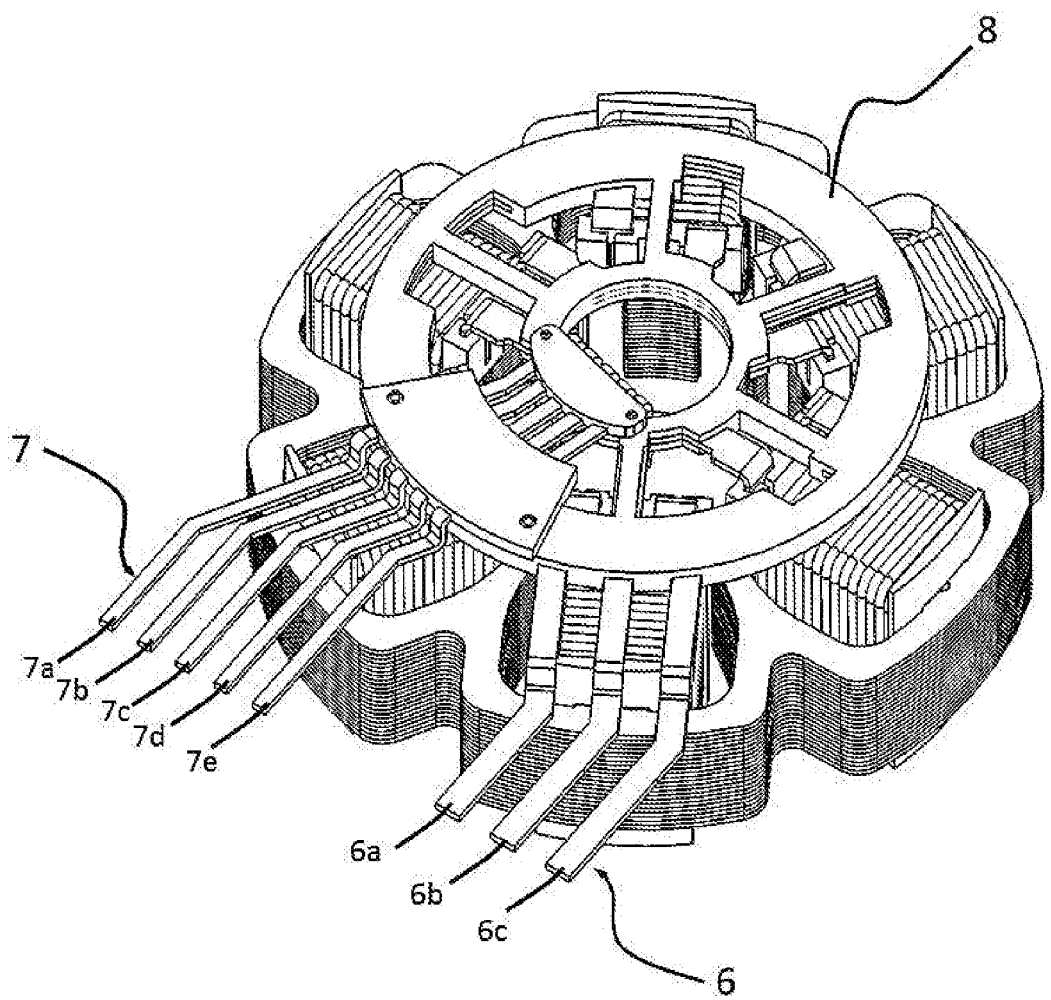

A first connector assembly 6 is positioned on an end face of the stator 1 to ensure electrical connection of the coils 2. The second connector assembly 7 is then positioned to manage (supply and output) the sensing elements (typically Hall effect probes) necessary for the operation of the brushless motor on an outer surface of the first connector assembly 6 as shown in FIG. 2. The first connector assembly 6 is indexed on the stator 1 by means of guide cavities 4 provided in the coil bodies 3 for precise positioning. The electrical connection is ensured by inserting line terminations of the first connector assembly 6 in the notches 5 of the coil body 3, for example by Insulation Displacement contact (IDC).

In this example, there are three electric phases which are powered by three separate tracks 6a, 6b, 6c. The tracks 6a, 6b, 6c extend radially and then laterally with respect to the stator, and are in the form of tracks with rectangular section. The tracks end in forked connection tabs (not shown) for connecting an electrical phase by IDC contact. This assembly is produced by cutting and folding a metal foil, for example bronze or a CuZn30-type copper alloy, and then overmoulded with an insulating resin 8 as shown in FIG. 2.

The second connector assembly 7 shown in FIG. 2 allows the connection of a set of signals—for example those of Hall probes belonging to an encoder for sensing the position of the rotor of the said motor from a printed circuit to the same connector. Here, five tracks 7a to 7e are used to enable the input and the evaluation of the signals of the Hall probes. This second assembly 7 is then positioned on the first coated assembly as shown in FIG. 2. This embodiment of the stator 1, associated with the first 6 and second 7 connector assembly, is described more precisely in the Application FR 12/59035.

Figure 3:
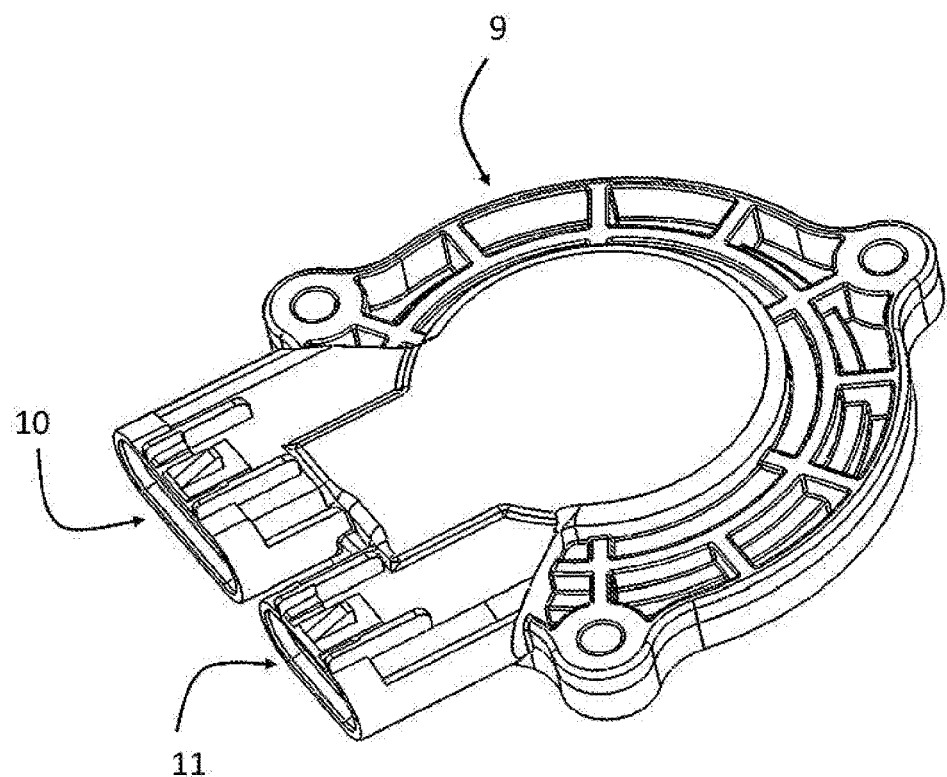
FIG. 3 shows the coated stator module.
Figure 4:
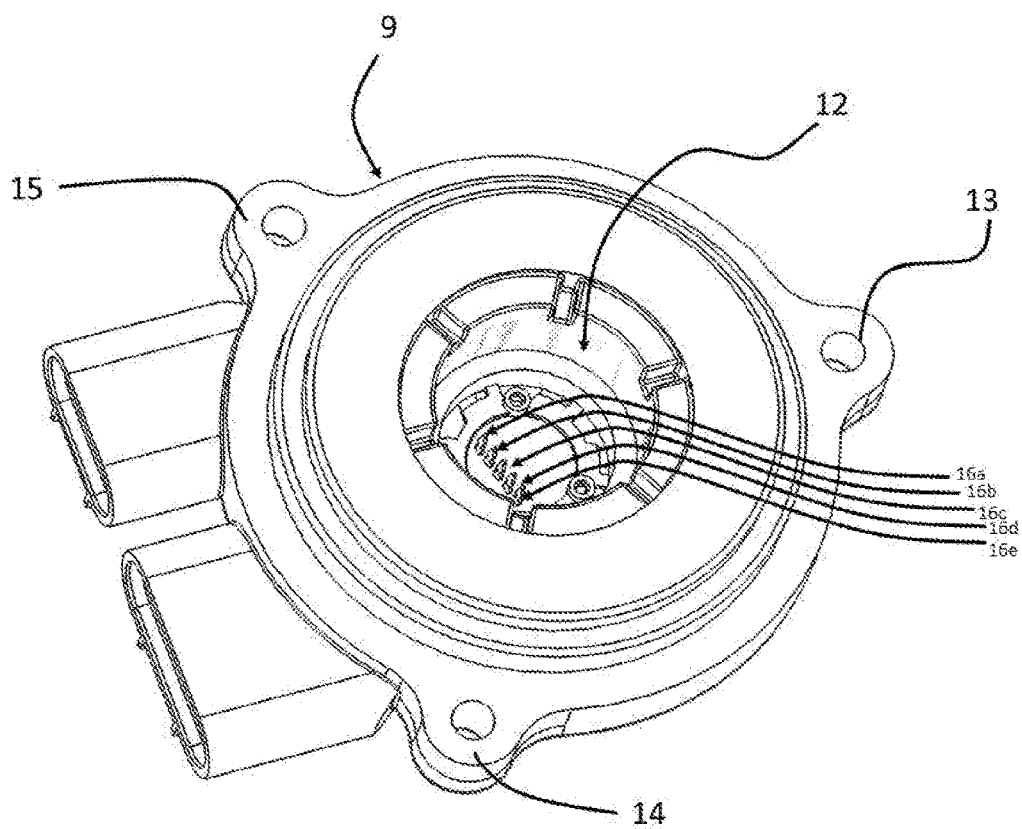
FIGS. 4 and 5 represent views of the cavity formed in the stator coated respectively before and after the insertion of the electronic circuit.

The stator 1 as well as the first 6 and second 7 assemblies are coated together in an injection mould to form a closed monolithic part shown in FIG. 3. The coated assembly then constitutes the stator module 9.

The shape of this stator module 9 may vary depending on the final applications. In the example of FIGS. 1 to 6, this is a first embodiment known as a "disc" in the sense that the actuator produced has a larger dimension according to its diameter than its height.

The overmould coating here covers all the components of the stator except for the ends of the various tracks 7a to 7e and 6a to 6c which protrude inside two openings 10 and 11, to allow an electrical connection to an external socket or to an attached external electronic circuit. Inside this stator module 9, the teeth of the stator 1 are either flush with the overmoulding or covered with a thin skin during overmoulding. This monolithic part forming the stator module 9 has an annular cavity 12 whose bottom is closed in this first embodiment of FIG. 4. The stator module 9 has three lateral protuberances 13 to 15 drilled to allow the actuator to be secured. The overmoulded stator module 9 is thus totally sealed and self-contained.

Figure 5:
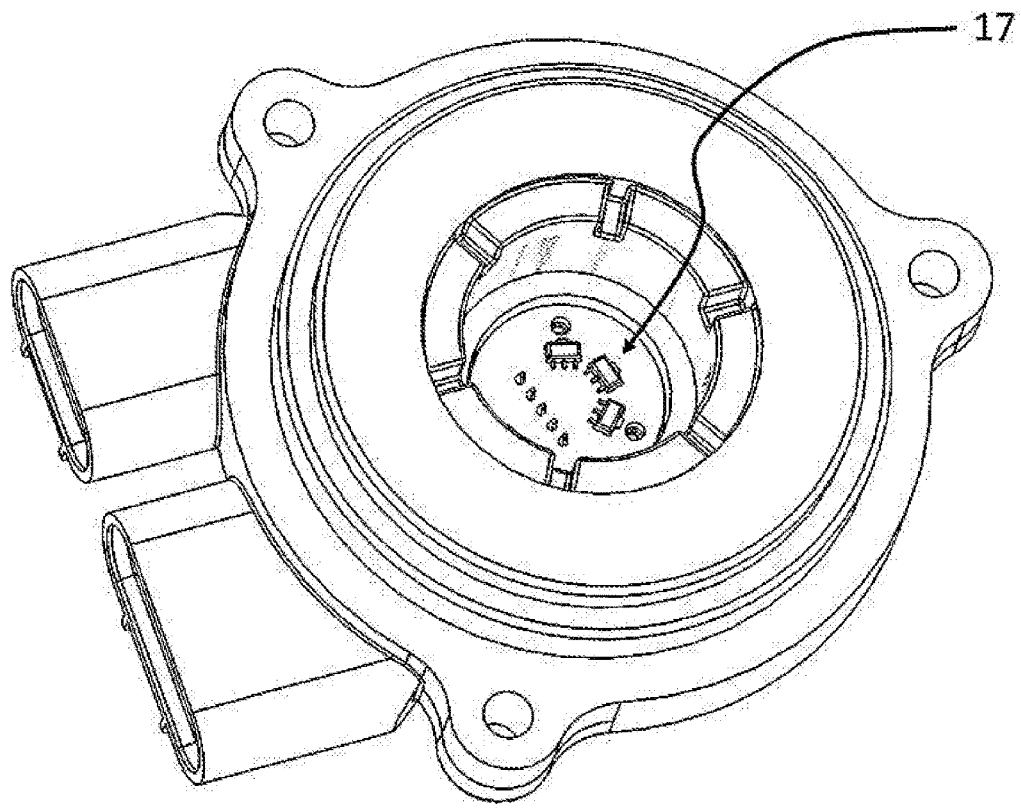

The bottom of the cavity 12 allows the tabs 16a to 16e of the second connector assembly 7 to be protruded, i.e., the inner ends of the tracks 7a to 7e. These tabs 16a to 16e connect to a disc-shaped electronic circuit 17, which can be housed at the bottom of the cavity 12 as shown in FIG. 5.

Figure 6:
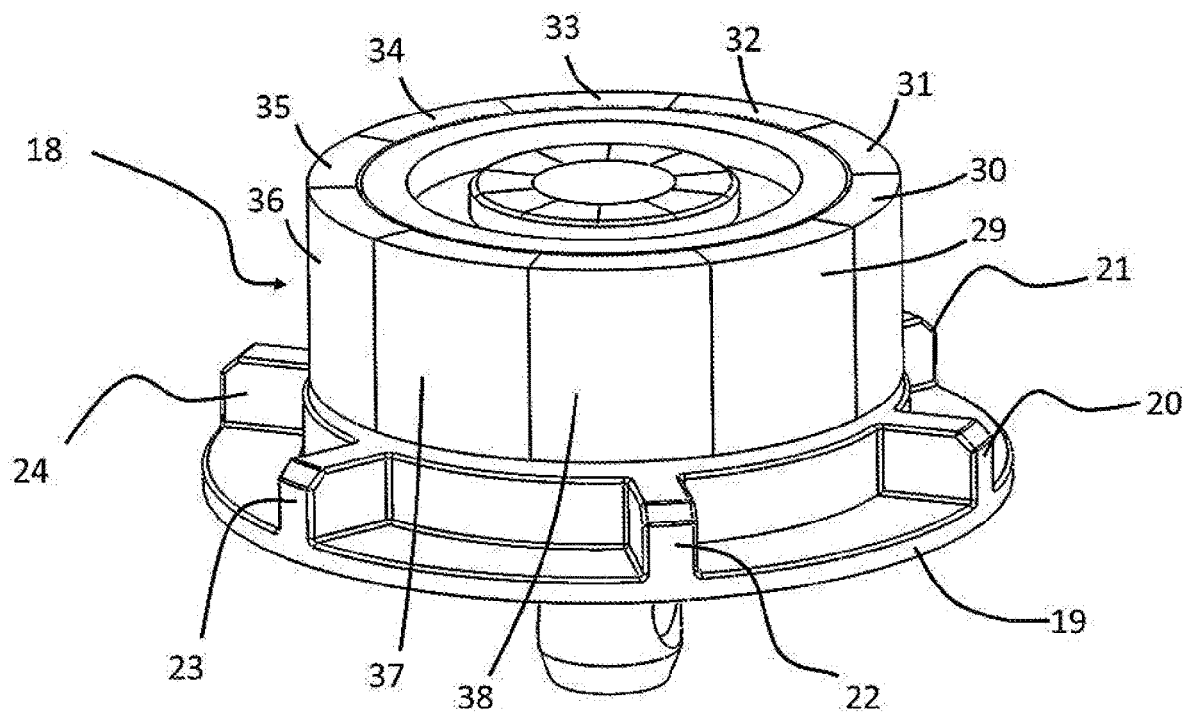
FIGS. 6 and 7 represent views of the rotor module respectively in three-quarter view and in longitudinal section.
Figure 7:
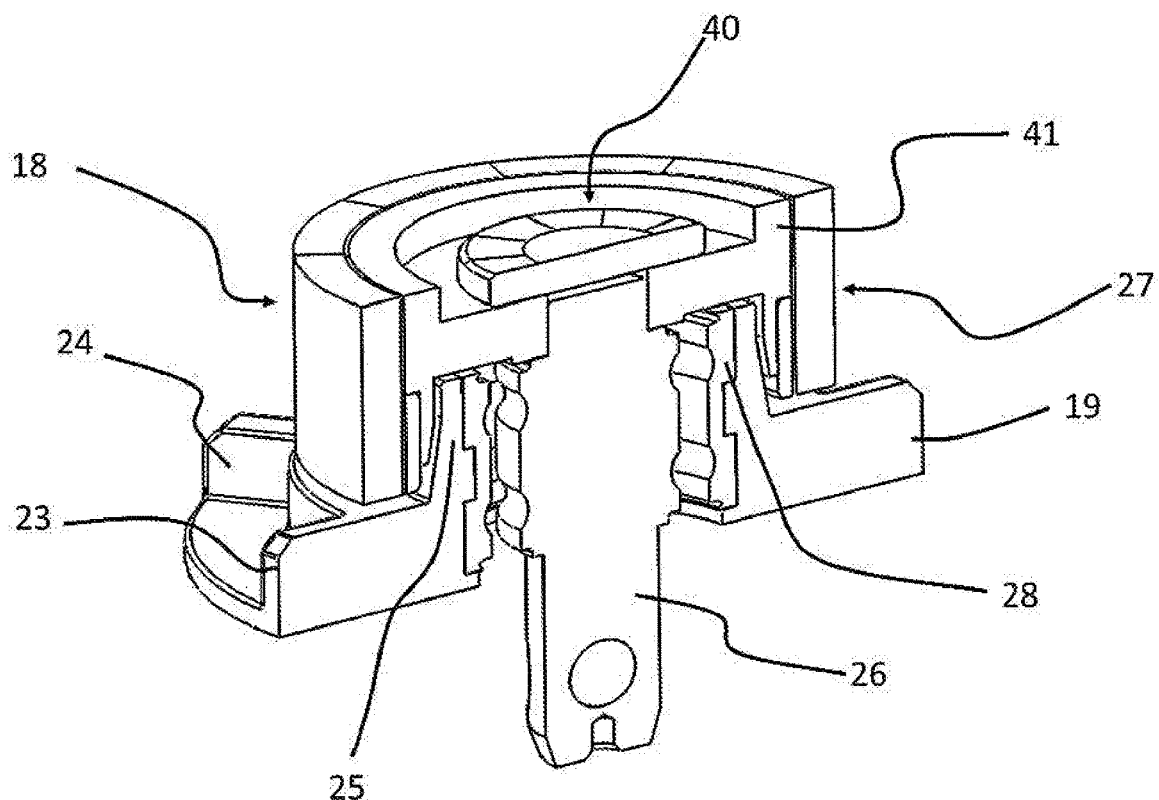

The stator module 9 enables, because of its shape, to receive a rotor module 18 shown in FIGS. 6 and 7. The rotor module 18 includes a flange 19 with radially extending centering lugs 20 to 24 and which also has a mechanical rigidity function. The flange 19 forms a ring 25 on the inside of the rotor module 18 which receives a guide element 28 guiding the axis 26 of the magnetic rotor 27. The magnetic rotor 27 consists of an alternation of permanent magnets 29 to 38 of alternate polarities (North/South).

FIG. 7 shows a sectional view of the rotor module 18 making it possible to better appreciate the relative positioning of the flange 19 and the bearing 25 for guiding the shaft 26. The ferromagnetic cylinder head 41 can be seen on which the magnets 29-38 and the encoder magnet 40 are positioned, consisting of alternating magnetized polarities. This encoder magnet 40 serves in detecting the position of the rotor together with the sensing elements and the electronic circuit 17 at the bottom of the non-opening cavity 12 of the stator module 9, facing this encoder magnet 40 when the stator 9 and rotor 18 modules are assembled.

Figure 8:
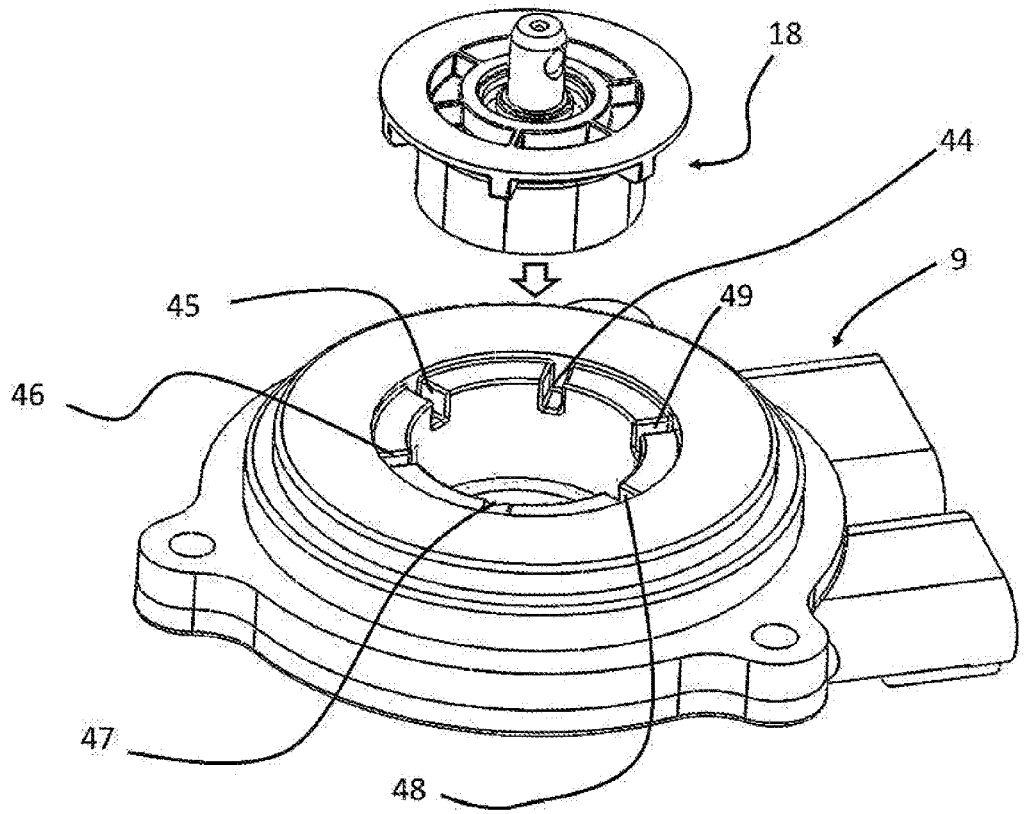
FIGS. 8 and 9 represent views of the assembly of the coated stator and of the rotor module respectively before assembly and after assembly, in a first embodiment, called a "disc" mode.
Figure 9:
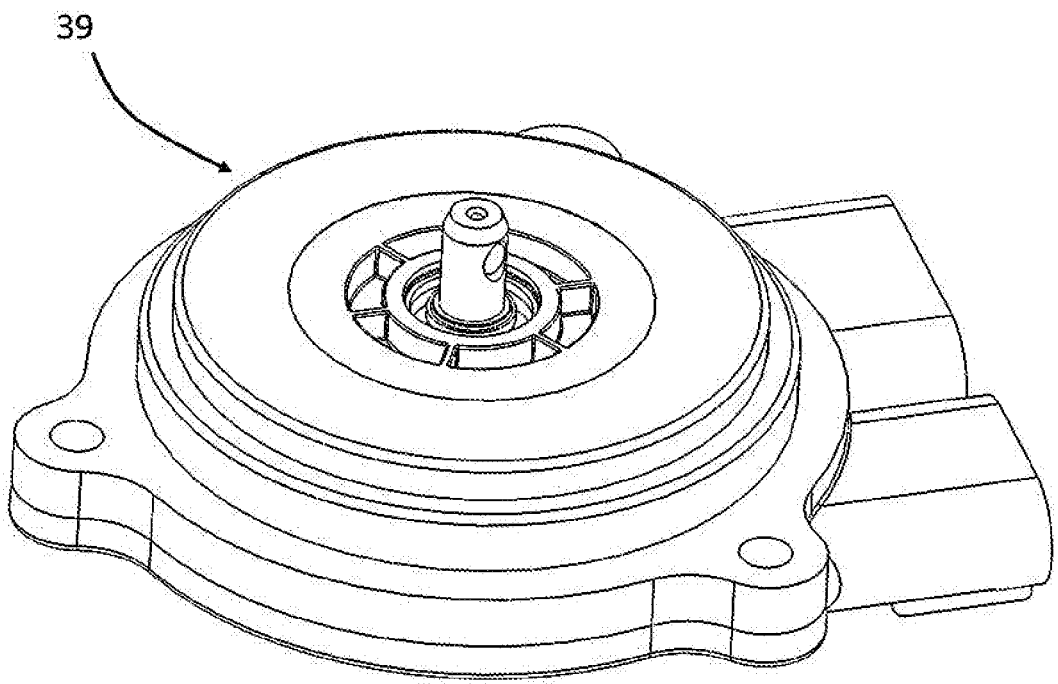

FIG. 8 shows the positioning of the rotor module 18 in the stator module 9 by insertion in axial displacement (relative to the actuator rotation axis), the indexing of the two modules by means of the lugs 20 to 24 which are housed in complementary housings 44 to 49 and then assembled by screwing, gluing, ultrasonic welding or any other known assembly method. FIG. 9 shows a view of both assembled modules forming the actuator 39 in its finalized version.

Figure 10:
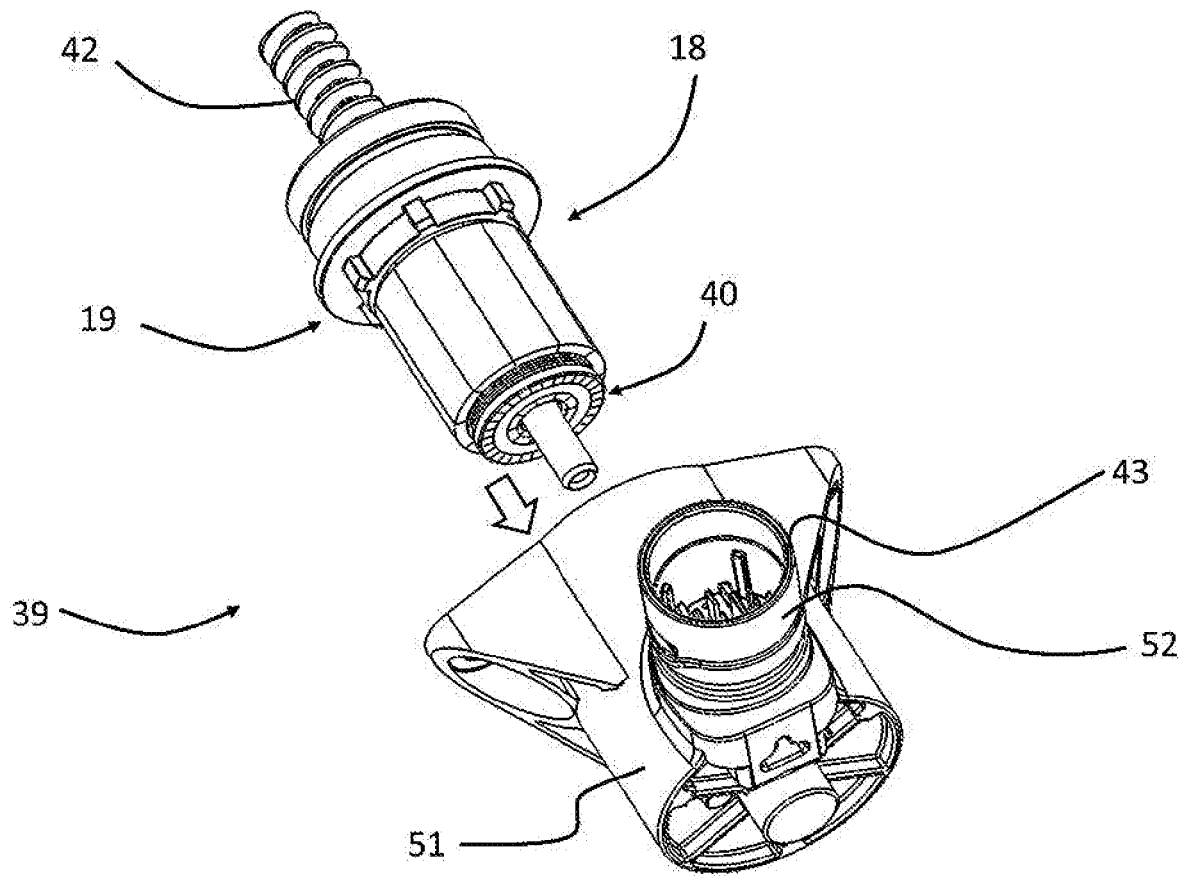
FIGS. 10 to 12 represent views of the assembly of the coated stator and of the rotor module respectively before assembly (FIG. 10), in cross sectional view (FIG. 11) and after assembly (FIG. 12), in a second embodiment called "tubular" mode.
Figure 11:
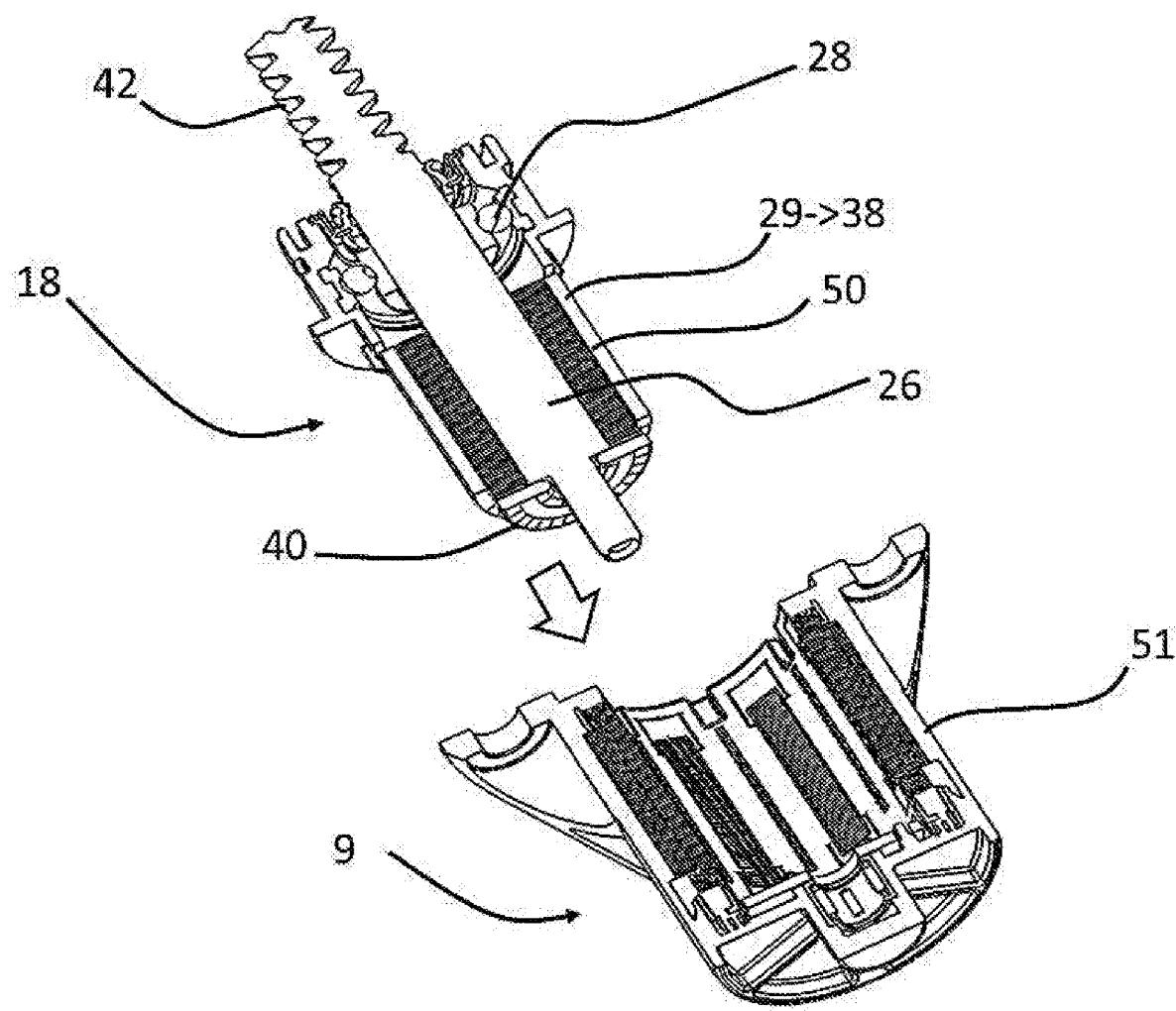
Figure 12:
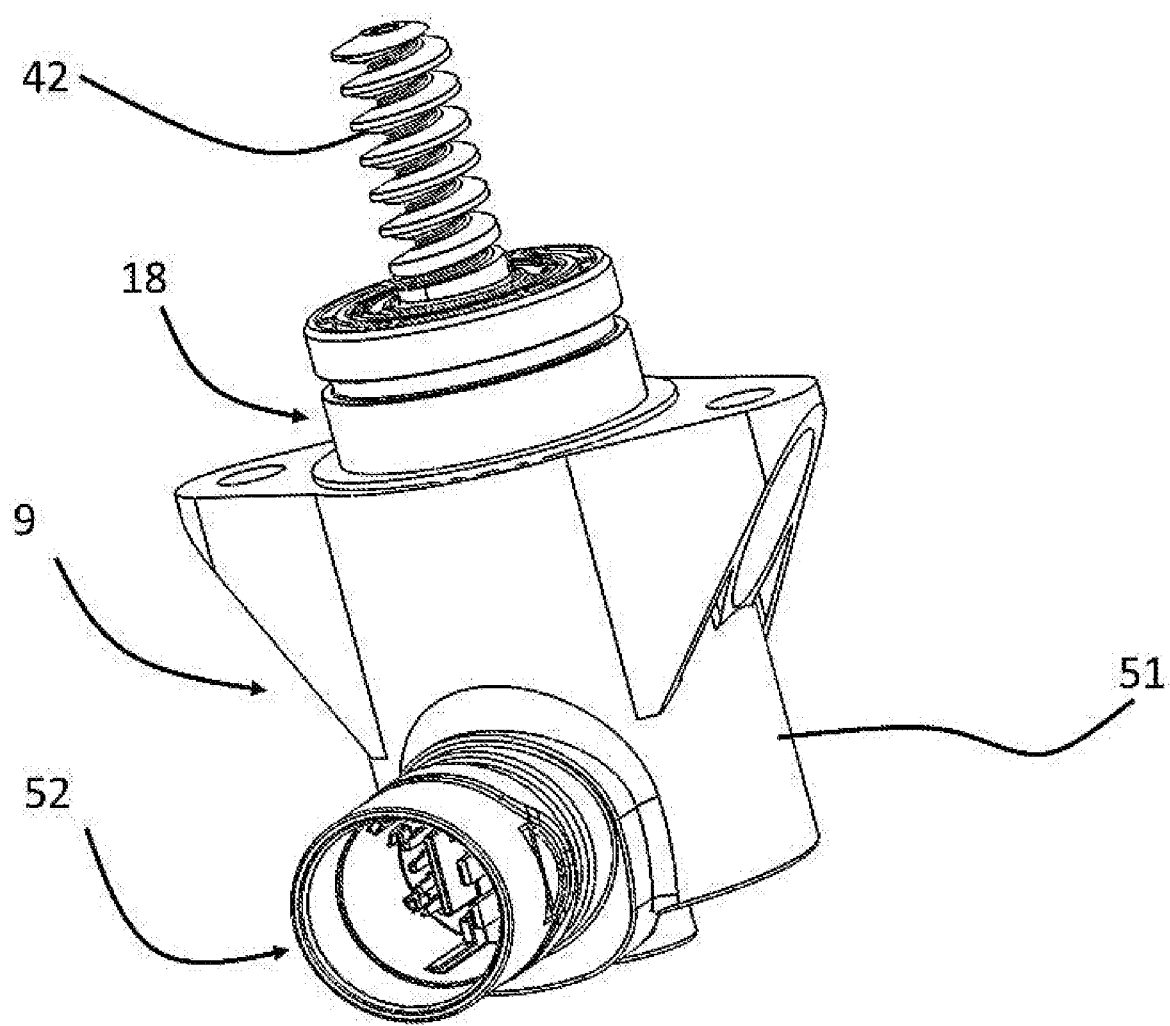

FIGS. 10, 11 and 12 represent a second embodiment of the actuator 39 in a so-called "tubular" shape, that is to say an actuator whose height dimension is greater than that of its diameter. In this variant, the actuator 39 drives a screw 42. In this example, the stator module 9 locally has an electrical connection socket 43 extending radially with respect to the rotation axis of the actuator 39. The rotor module 18 comprises a flange 19 receiving, just as the first embodiment, a housing for a guide element 28.

FIG. 11 shows a sectional view of the stator of this other variant embodiment. The rotor module 18 has an inner core formed by a stack of disc laminations 50 which are forcefully engaged on a shaft 26 and supporting permanent magnets (29-38) in the form of tiles. The stator 1 is fed by means of a connector assembly described in European Patent EP2212985 by the Applicant. The stator 1 receives a second connector assembly 7 for the positioning of a Hall probe.

This assembly is overmoulded to form a monolithic part, with a main body 51 and a secondary body 52 whose longitudinal axis is perpendicular to that of the main body 51. In the embodiments shown above, the rotor module 18 is indexed, based on the complementarity of the shapes of the modules, inside the stator module 9.

Figure 13:
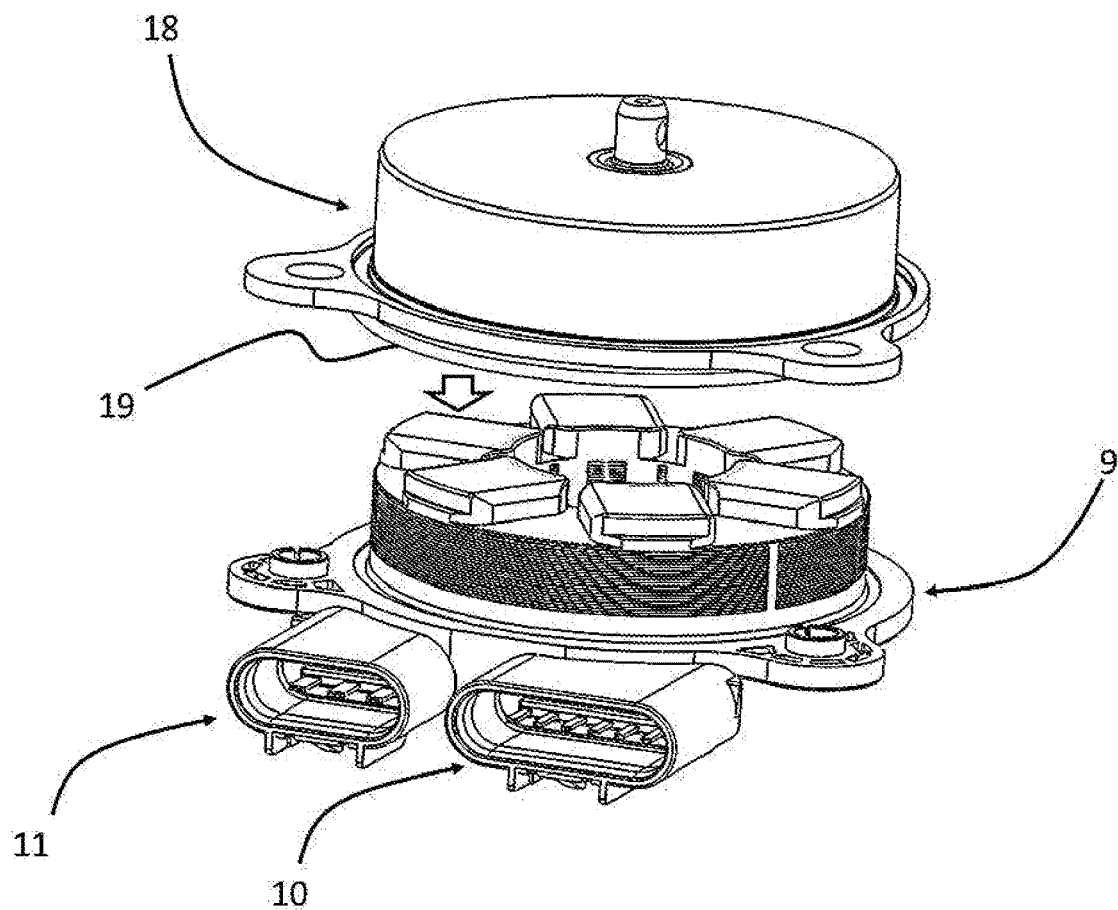
FIGS. 13 and 14 represent views, respectively before assembly of the modules and after assembly of the modules, in a third embodiment in which the rotor module comes around the stator module.
Figure 14:
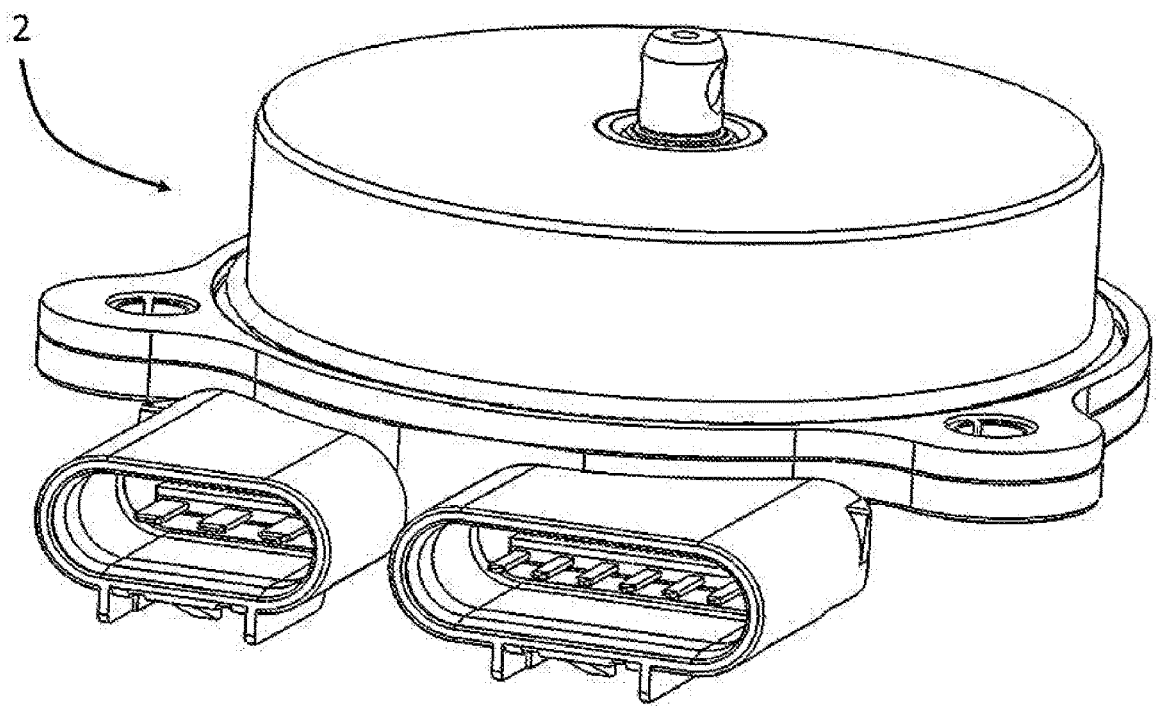
Figure 15:
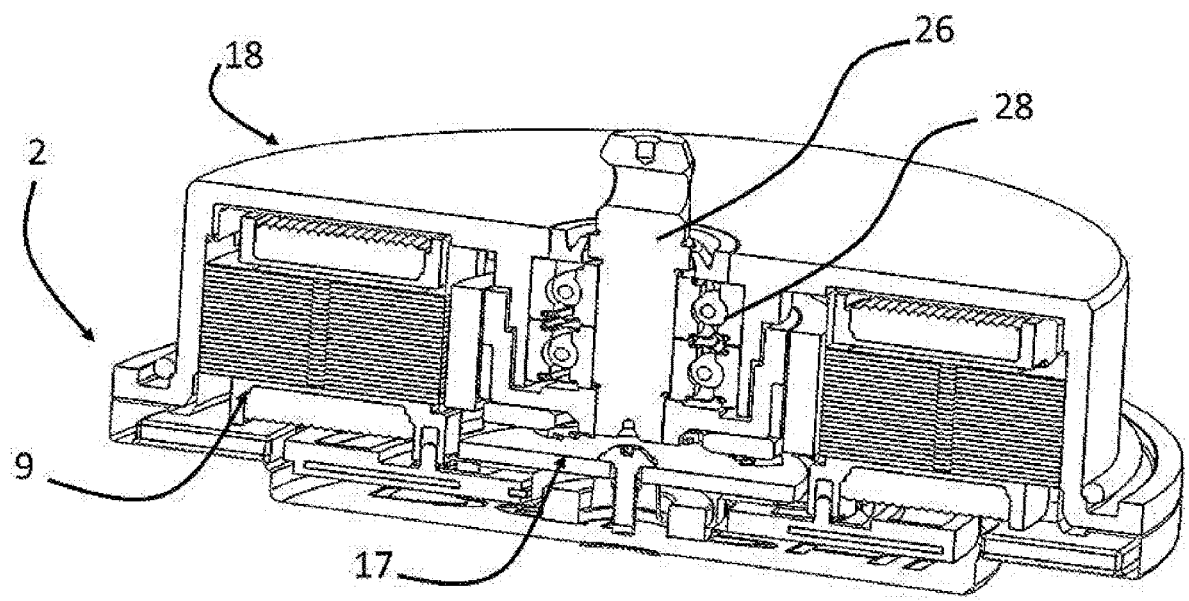
FIG. 15 shows a sectional view of the modes described in FIGS. 13 and 14.

FIGS. 13 and 14 show a third embodiment where the rotor module 18 is fastened to the stator module 9 from the outside. The flange 19 of the rotor module 18 has in this case a diameter greater than that of the stator 1 of the stator module 9. FIG. 15 makes it possible to appreciate the detail of the elements that are found in this embodiment. The various elements pointed being identical in their function to those mentioned in the preceding modes.

The invention is not limited to a motor that has a stator with radial teeth. It also applies to an engine whose stator has teeth extending parallel to the axis, with a disc rotor, or a linear motor. The variant embodiment of FIGS. 10, 11 and 12 makes it possible to produce a so-called "tubular" version described above.

Figure 16:
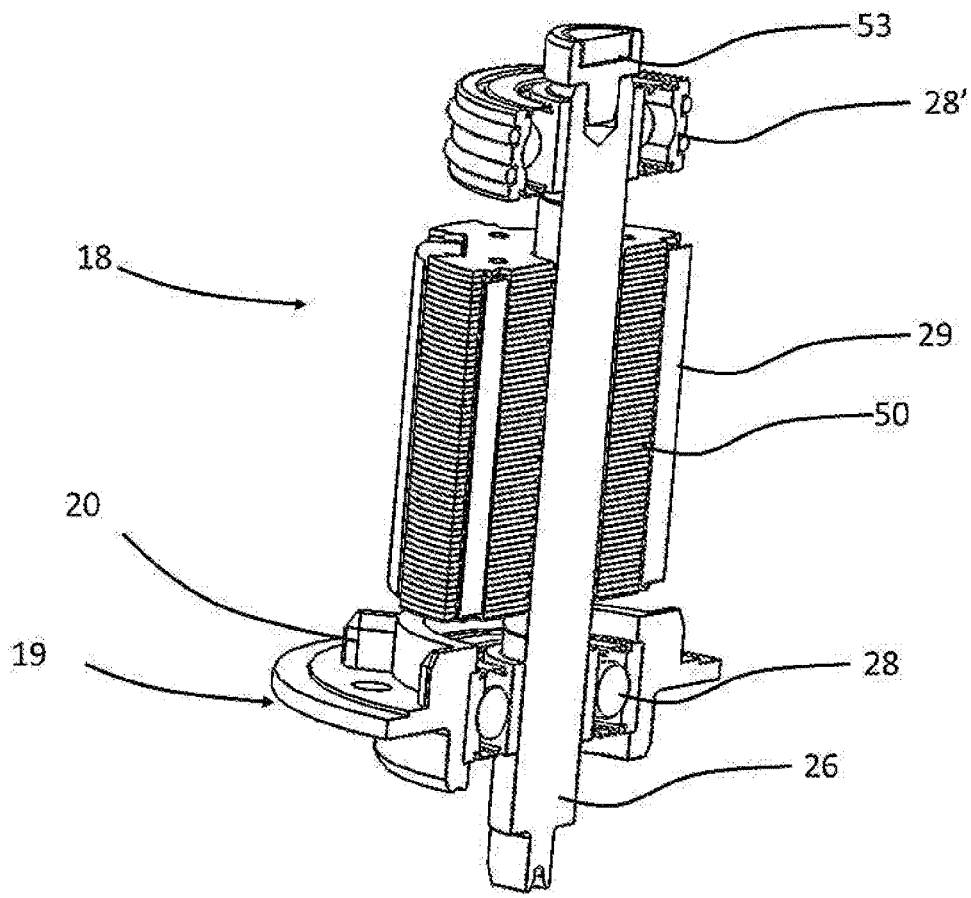
FIGS. 16 and 17 represent sectional views, respectively of the rotor module and the stator module, of an alternative tubular embodiment.
Figure 17:
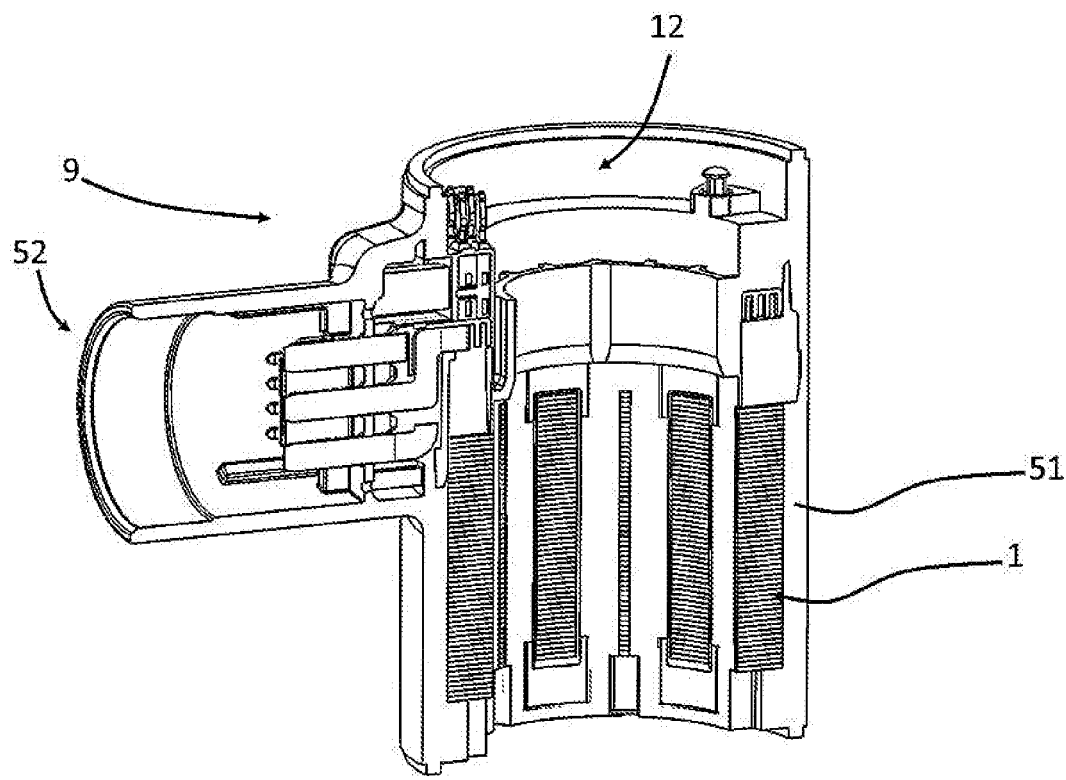
Figure 18:
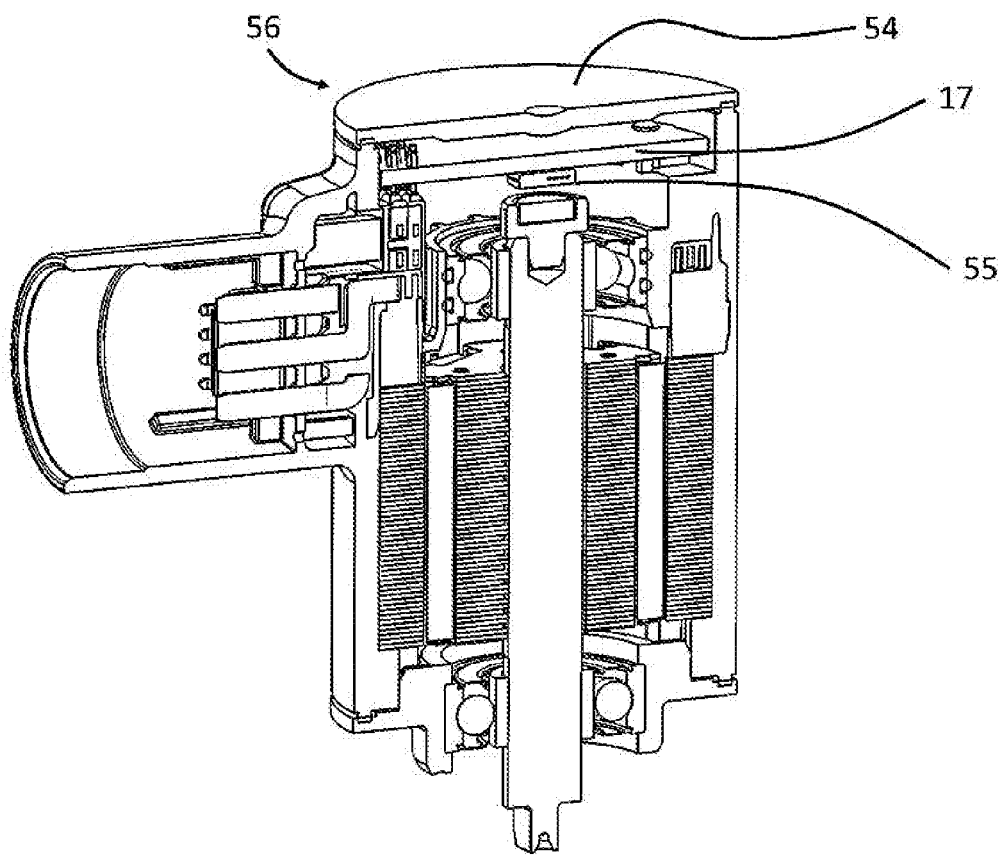
FIG. 18 is a sectional view of the engine assembled from the modules described in FIGS. 16 and 17.

It is possible to envisage an alternative embodiment in order to obtain a more compact set. This alternative is particularly described in FIGS. 16 to 18. This form of embodiment differs from the mode described in FIG. 10 in that the rotor module 18 comprises a second, a guide element 28' which is made secured to the shaft 26 after mounting the stack of laminations 50. This embodiment makes it possible to mount two guide elements 28 and 28' of smaller sizes and allows easier assembly in the stator module 9.

The rotor module 18 is typically made with the following steps:

the front guide element 28 to form the flange with its positioning and indexing pins 20, assembling the stack of laminations 50 on the rotor axis 26, bonding of the magnet(s) 29 of the motor on the stack of laminations 50, assembling the rear guide element 28' on the shaft 26 comprising the stack of laminations 50.

In the example described, a sensor magnet 53 is then assembled with its support on the free end of the spindle (for example by forcing through or screwing). After the magnetization of the magnets of the motor and of the sensor in place, this assembly of the axle+stack of laminations+magnets of the motor+rear bearing+magnet sensor on its support is finally assembled to the overmoulded module formed from the rear guide element 28 and the flange 19. The stator module 9 specifically has an internal opening cavity 12 which makes it possible to assemble the more easily formed rotor module 18 and to bring back a third module 56, thereby closing the actuator on the rear part.

After assembling both the stator 9 and rotor 18 modules, it is thus necessary to add a complementary electronic module comprising, in this example, the printed circuit 17 receiving the detection probe(s) 55 of the magnetic field sensor and a closure cap 54. This embodiment has the advantage of enabling the integration of a printed circuit of larger size (than that shown in the embodiment of FIGS. 10 and 11), so that it may also be possible to place an on-board electronic control circuit directly driving the phases of the engine.

Figure 19:
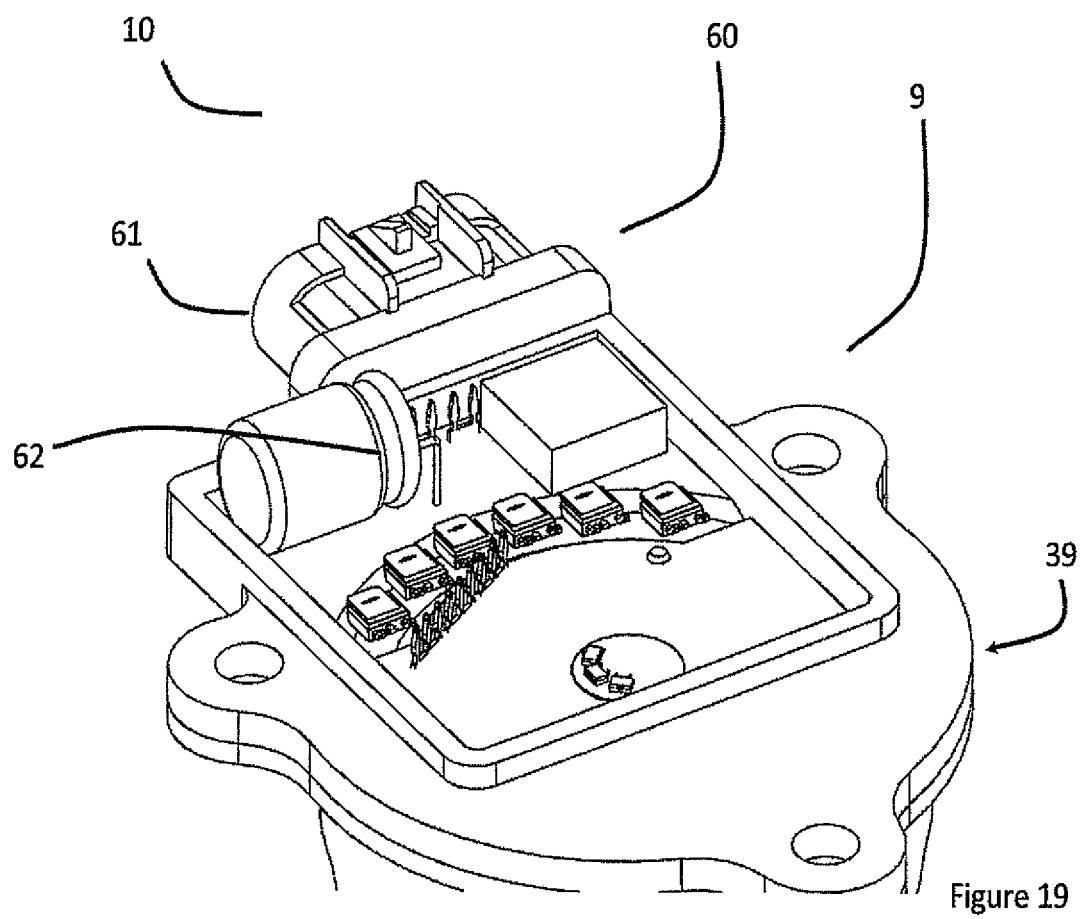
FIG. 19 shows a variant embodiment of the invention.

FIG. 19 shows an alternative embodiment of an actuator 39 according to the invention in which the stator module 9 accommodates an on-board electronic circuit that enables the motor control system management. This is called an "intelligent" or "smart" motor and the connector technology leaving the motor is simplified because there is no need to remove the electrical tabs of the second connector assembly 7 from the motor. Typical elements that can be found in this electronic circuit are: a switching logic management module 60, one or more filtering capacitors 61, a set of MosFet-type switching transistors 62 to control the supply of the various phases. These electronic elements are then positioned on the overmoulded stator module 9 and a lid (not shown) can be placed glued, welded, screwed or riveted to complete the motor.

The invention claimed is:

1. An electronic actuator comprising a polyphase brushless motor comprising:
    a rotor provided with permanent magnets and secured to an output shaft;
    a stator supporting coils and providing a magnetic drive of the rotor;
    a first electrical connection assembly powering the coils;
    the stator being part of a stator module including an over-molding material which encases the wound stator as well as the first electrical connection assembly;
    the rotor being part of a rotor module comprising a flange over-molding a bearing that guides the shaft of the rotor;
    the rotor module being a first component integrating the rotor, a guide and a flange;
    the stator module being a separate second component integrating the stator, and the first electrical connector assembly; and
    the stator module and the rotor module indexing and attaching relative to one another.

2. The electronic actuator, according to claim 1, further comprising a second electrical connection assembly managing the supply and the signals of sensing elements necessary for switching of various phases of the motor and the stator module coating the first and the second electrical connection assembly.

3. The electronic actuator, according to claim 2, wherein the first and the second electrical connection assemblies form a radial over-molded extension of the stator module.

4. The electronic actuator, according to claim 2, wherein the first and the second electrical connection assemblies form an axial over-molded extension of the stator module.

5. The electronic actuator, according to claim 1, wherein the stator module has a cavity adapted to receive the rotor module.

6. The electronic actuator, according to claim 5, wherein the cavity is cylindrical and closed at its rear part by a molded bottom.

7. The electronic actuator, according to claim 6, wherein the molded bottom comprises a ring guiding the rotation axis of a rotor.

8. The electronic actuator, according to claim 5, wherein the cavity has an open end.

9. The electronic actuator, according to claim 8, further comprising a third module comprising an electronic circuit and the third module closing the actuator on a rear part.

10. The electronic actuator according to claim 1, wherein the flange has an external shape complementary to lugs or pins performing the indexing of the stator module.

11. The electronic actuator, according to claim 10, wherein the flange of the rotor module has centering pins adapted to engage in complementary housings formed on the stator module.

12. The electronic actuator, according to claim 1, wherein the stator module comprises a set of superimposed laminations with a plurality of teeth, at least part of which supports an electric coil, each of the electrical coils having axially extending connecting lugs, the stator module further including a plurality of teeth for connecting a complementary connector, all of the components comprising a wound sheet assembly, the coil connecting lugs, and the connector lugs for joining-up a connector are encased within an insulating plastic to form a monolithic block encompassing outer surfaces of the superimposed laminations.

13. The electronic actuator, according to claim 12, wherein the inner surface of the teeth of the stator plates are flush with inner surface of the monolithic block.

14. The electronic actuator, according to claim 12, wherein an inside surface of the teeth of the stator plates is included in the monolithic block, a thickness of the over-molding material, which is insulating plastic material, being less than an air gap between the outer cylindrical surface of the rotor and a cylindrical envelope defined by a surface of the stator teeth.

15. The electronic actuator, according to claim 1, wherein the actuator provides motor control, the over-molded stator module accommodating an electronic circuit for controlling the actuator and has switching transistors and a logic control circuit for these switching transistors.

16. The electronic actuator, according to claim 15, further comprising a cover enclosing the electronic circuit, the transistors and the logic control circuit, placed on the stator module.

17. A method of manufacturing a magnetized rotor module comprising a flange enclosing a guide guiding an axis of a rotor for an actuator, the method comprising:

over-molding a front guide to form the flange with positioning, and indexing pins or lugs, radially projecting outwardly from the rotor axis;

assembling a stack of laminations on the rotor axis;

bonding of magnet(s) of a motor on the stack of laminations; and assembling a rear guide on the axis comprising the stack of laminations.

18. The method according to claim 17, further comprising encasing joining connector lugs, coil connecting lugs and a wound sheet assembly within an over-molded plastic to form a monolithic block encompassing outer surfaces of the laminations.

19. The method according to claim 17, further comprising assembling a sensor magnet to an end of a rotatable spindle, and assembling a printed circuit to an over-molded stator module adjacent to the sensor magnet.

20. The method according to claim 17, further comprising over-molding to integrate together the rotor and the flange, and over-molding to integrate together a stator and electrical connectors.

\* \* \* \* \*